Figure 2:
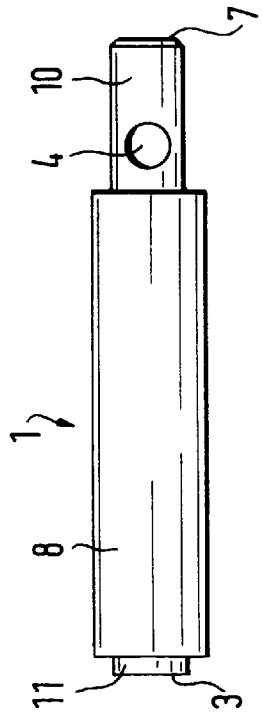

United States Patent
Marazzi et al.

[11] Patent Number: 5,963,692
[45] Date of Patent: Oct. 5, 1999

[54] PLUG FOR AN OPTICAL FIBER PLUG CONNECTOR AND METHOD OF ITS MANUFACTURE

[75] Inventors: Silvio Marazzi, Locarno; Stéphane Chappuis, Ronco S/Ascona, both of Switzerland

[73] Assignee: Diamond SA, Losone, Switzerland

[21] Appl. No.: 09/008,495

[22] Filed: Jan. 16, 1998

[30] Foreign Application Priority Data

Feb. 13, 1997 [CH] Switzerland ............................ 0313/97

[51] Int. Cl.$^6$ ...................................................... G02B 6/36
[52] U.S. Cl. ................................... 385/80; 385/96; 385/99
[58] Field of Search ................................ 385/80, 96, 99

[56] References Cited

U.S. PATENT DOCUMENTS

| | | | |
|---|---|---|---|
| 3,810,802 | 5/1974 | Buhite et al. | 385/99 |
| 4,129,932 | 12/1978 | Stancati | 385/99 |
| 4,598,974 | 7/1986 | Munn et al. | 350/96.21 |
| 5,095,519 | 3/1992 | Dorsey | 385/96 |
| 5,257,337 | 10/1993 | Grigsby et al. | 385/96 |
| 5,436,999 | 7/1995 | Brehm et al. | 385/96 |
| 5,740,301 | 4/1998 | Harman et al. | 385/96 |

FOREIGN PATENT DOCUMENTS

| | | |
|---|---|---|
| 0 094 906 | 5/1983 | European Pat. Off. . |
| 195 17 750 | 5/1995 | Germany . |
| WO 96/31795 | 10/1996 | WIPO . |

*Primary Examiner*—Rodney Bovernick
*Assistant Examiner*—Robert E. Wise
*Attorney, Agent, or Firm*—Shoemaker and Mattare, LTD

[57] ABSTRACT

A pre-fitted optical fiber section (2) is held in a plug ferrule (1) in such a way that it extends from a face (3) up to a lateral fusion access aperture in the plug ferrule (1). From the direction of an entry surface (7) at the cable-end, a bore (6) running coaxially to the optical fiber section also leads into the fusion access aperture. Within the fusion access aperture, the pre-fitted optical fiber section can be welded to the optical fiber (27) of an optical fiber cable (24) in the field. The plug ferrule is assembled from at least two components, of which one (8) possesses the outer jacket serving to center the plug ferrule and the other (10) possesses the fusion access aperture (4) and the bore (6). Both components comprise differing materials, which considerably facilitates manufacture.

11 Claims, 4 Drawing Sheets

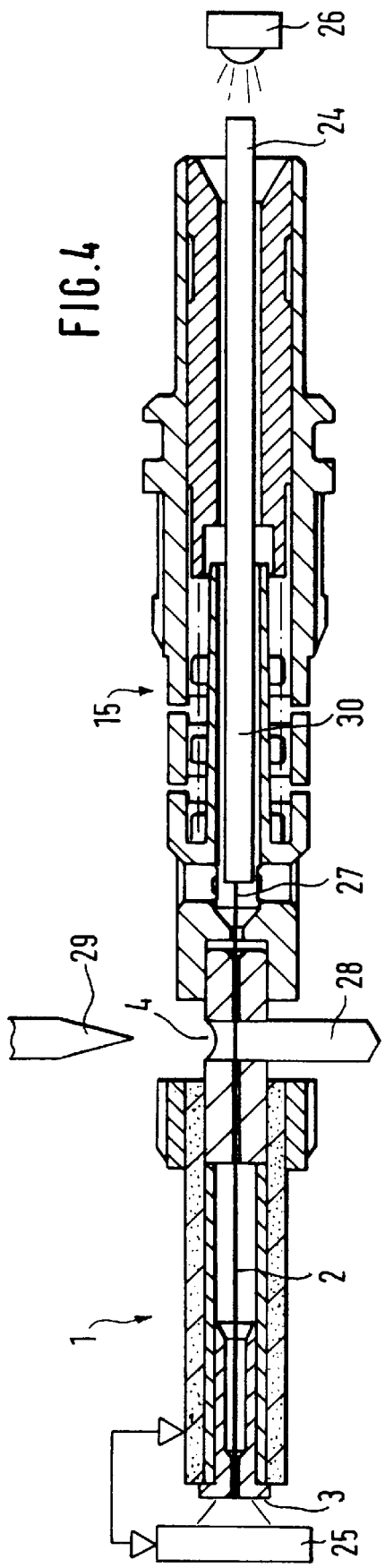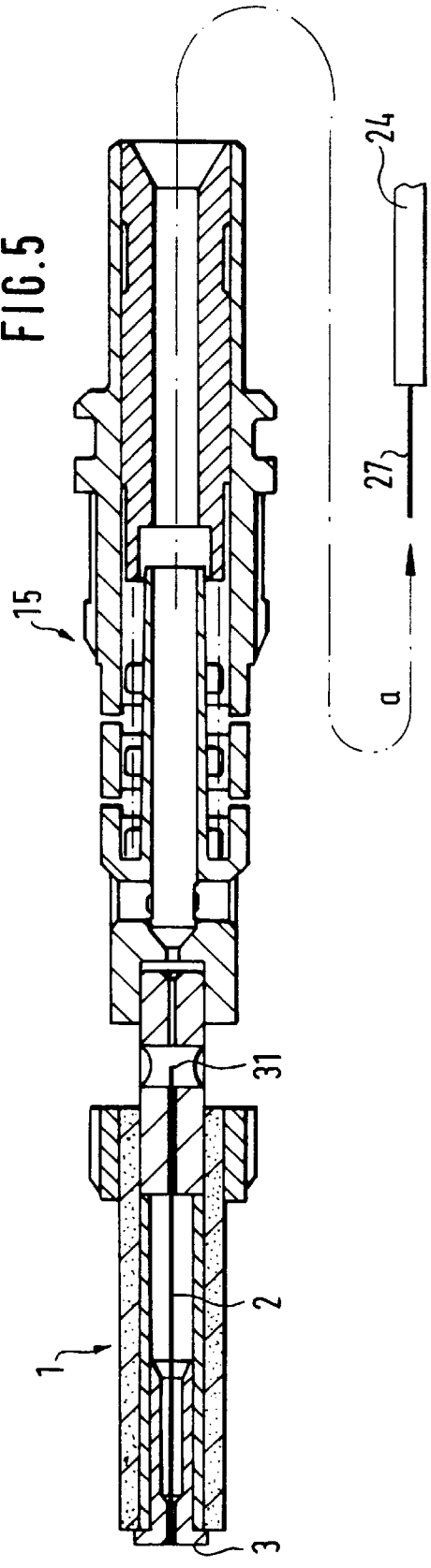

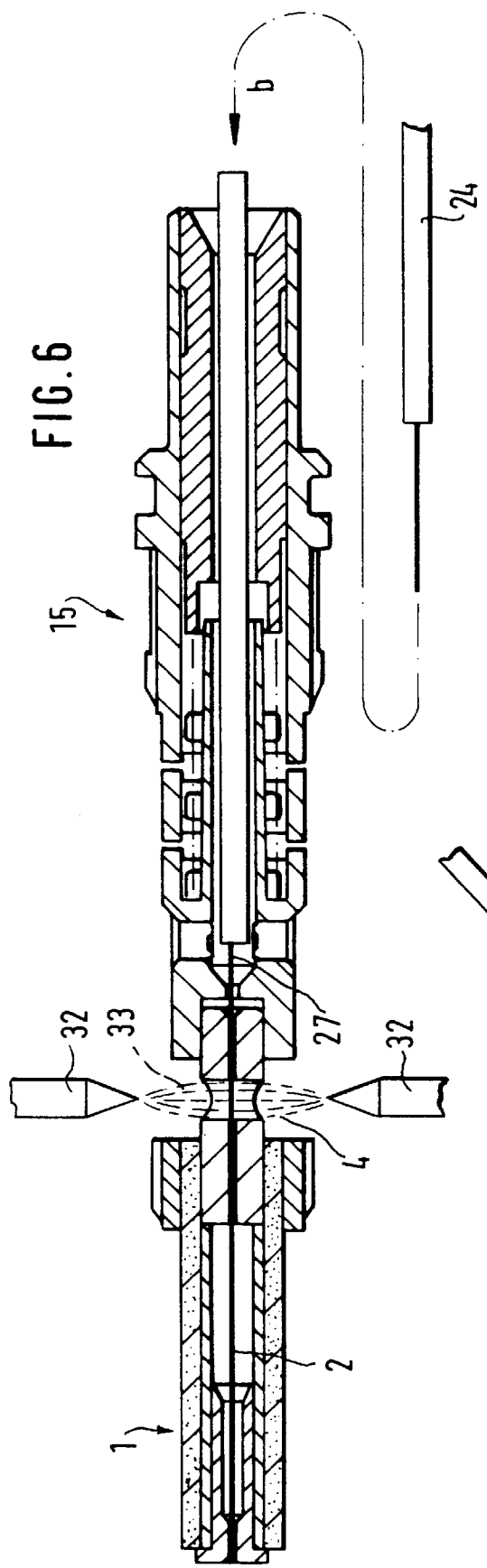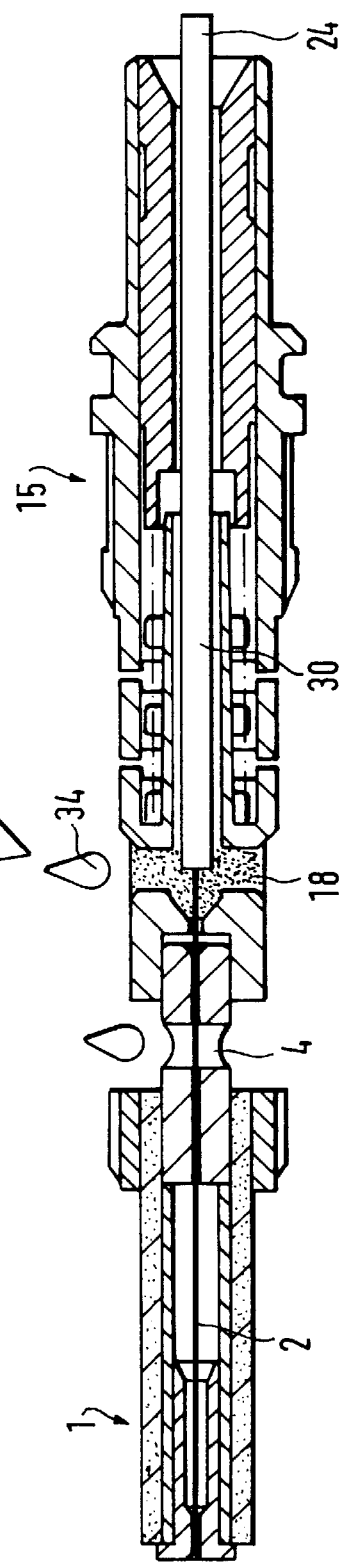

PLUG FOR AN OPTICAL FIBER PLUG CONNECTOR AND METHOD OF ITS MANUFACTURE

The invention concerns a plug for an optical fiber plug connector according to the preamble to claim 1.

With these types of plugs, the optical fiber cable has not already been fitted at the manufacturing works with a plug as a so-called pig-tail; rather, the plug is first fitted in the field after stripping the cable. Merely a section (stub) of the cable has been pre-fitted in the plug ferrule, said stub being connected to the optical fiber cable prior to final assembly of the plug by means of a weld. Related, comparable plugs have, for example, been disclosed in WO 96/31795 or DE-A-195 17 750.

A drawback encountered with the plugs according to the state of the art is that the plug ferrule is formed as a monolithic body simultaneously serving the exact positioning of the optical fiber within the plug connector and welding of the optical fiber. In order to ensure the most exact positioning possible in the plug connector, and thus low attenuation, the plug ferrule must be manufactured from a hard, wear-resistant material, which can be worked only with difficulty. On the other hand, welding of the optical fiber in the field requires special working measures, in particular the formation of a lateral fusion access aperture. Processing of the monolithic plug ferrule of a ceramic or a sintered metallic material is thus extremely time consuming, and is associated with high costs.

It is therefore a purpose of the present invention to create a plug of the type mentioned in the introduction, said plug, without detriment to its function, being considerably simpler to manufacture. This purpose is, according to the invention, fulfilled with a plug possessing the features of claim 1. The subdivision of the plug ferrule into at least two components has the advantage that each of the two components can be manufactured according to its allocated function. A first component here serves to centre the plug ferrule and is accordingly provided with an outer jacket worked to high-precision; the second component serves exclusively the accommodation and welding of the pre-fitted optical fiber section and the optical fiber at the cable end.

It is of particular advantage if the first component is a plug sleeve and the second component is a connecting body inserted into said plug sleeve, wherein the fusion access aperture is arranged in a portion of the connecting body protruding out of said plug sleeve. With that, it is of advantage if the connecting body extends only over a portion of the total length of the plug sleeve. With that, the face is formed by an insert with a center bore, said insert being held within the plug sleeve, the optical fiber section being fixed within said center bore. With that, the optical fiber section is fixed only within the insert and at the connecting body, and in between extends within the plug sleeve via a hollow chamber. Insert and connecting body can, for example, by glued into the plug sleeve. Depending on the material, soldering or an alternative connection means would also be conceivable.

Preferably, the plug sleeve comprises a particularly hard material, such as ceramic material or hard metal, for example. These materials are particularly resistant and can be worked precisely. Conversely, the connecting body can comprise another material, preferably with a lesser hardness grade, such as ceramic material of lesser quality, quartz glass or another heat-resistant material, for example. The connecting body can in this way be worked with particular ease. Regardless of a certain temperature stress during the welding procedure, said connecting body is subjected to no other mechanical loading whatsoever. The insert on the face can also comprise a relatively soft material in comparison to the plug sleeve. On direct, in situ centering of the fiber face during fitting, preferably a soft alloy is used that can plastically deform. This centering method is, for example, disclosed in EP-A-94 906.

Preferably, an intermediate sleeve is arranged between the insert and the plug sleeve, said intermediate sleeve limiting the insertion depth of the connecting body. At the same time, this intermediate sleeve also serves to compensate differing coefficients of linear expansion between insert and plug sleeve.

Further improvements on the plug can be attained if the connecting body is connected to a cable accommodation element, said cable accommodation element possessing a first bore for accommodation of the optical fiber, and a second bore with larger diameter for accommodation of the jacket surrounding the optical fiber, and if, in the transitional area from the first to the second bore, a lateral filling aperture is arranged in the cable accommodation element for the filling of adhesive. As a result, on the one hand the cable is fixed within the plug, and on the other hand the exposed optical fiber is protected at this point.

The connecting body can be formed as a cylindrical section with a full-length, central longitudinal bore, wherein the fusion access aperture is a transverse bore penetrating the cylindrical section. In place of a bore, a slot could also be made, said slot penetrating up to the central longitudinal bore. The transverse bore produces a slightly better resistance to bending, however. The central longitudinal bore is preferably subdivided into two sections by the transverse bore, with the face-end section being longer than the cable-end section. The face-end section can, with that, penetrate sufficiently deeply into the plug sleeve. Conversely, the cable-end section must be formed to be just long enough in order to align the optical fiber, after introduction, exactly coaxially with the pre-fitted optical fiber section.

The invention also concerns a method for manufacture of a plug according to the preamble to claim 1. With that, the method must not, of necessity, concern a plug of the aforementioned type. The method can also be applied without problems to state-of-the-art plugs with monolithic plug ferrules.

A specific drawback encountered with state-of-the-art methods is that the pre-fitted optical fiber section is inserted without an opportunity for prior measurement of centricity, transmission attentuation, return loss and all other values. In practice, reliable quality control of the pre-fitted plug is thus hindered. Such quality control is only possible after the optical fiber cable has been welded into position and when light can be supplied to it. In DE-A-195 17 750 (mentioned in the introduction), gripping of the plug ferrule in a centering and grinding device is recommended, and the supply of light by means of an auxiliary optical fiber. Final working of the plug ferrule on the outer jacket can only take place at this stage, based on the values measured at the face. This method, too, is extremely time consuming, and does not permit precise measurements at the face.

The known drawbacks can, according to the invention, be overcome with a method possessing the features in claim 1. The introduction of a continuous optical fiber from the entry surface to the face, and subsequent centering and fixation at the face, permits working of the face-end of the fiber and the actual face to the final dimension already at this stage.

At the same time, all standard measurement procedures can also be carried out, as is usual with so-called pig-tail fitting. All measurement procedures can be recorded in a register, whereby a high standard of quality can be ensured. Only at this stage is the optical fiber severed in the fusion access aperture, so that the already-centred optical fiber section remains within the plug ferrule.

Further features and advantages of the present invention are more closely described in the following, with the aid of the drawings: namely, FIG. 1 a cross section through a plug ferrule according to the invention, FIG. 2 a plan view onto the plug ferrule according to FIG. 1, turned through 90°, FIG. 3 a cross section through an arrangement comprising plug ferrule and cable accommodation element, FIG. 4 an arrangement according to FIG. 3 with optical fiber having been introduced prior to severing of the pre-fitted section, FIG. 5 an arrangement according to FIG. 4 with optical fiber cable having been withdrawn, FIG. 6 the arrangement according to FIG. 5 on welding of the introduced optical fiber cable, FIG. 7 the arrangement according to FIG. 6 after the welding procedure, and FIG. 8 a perspective representation of a plug, connected to a cable and with further components.

Figure 1:
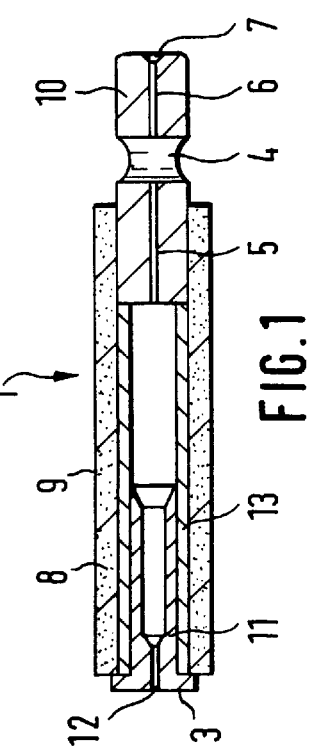

In FIGS. 1 and 2, a plug ferrule 1 is shown assembled from a plurality of components. A plug sleeve 8 of a ceramic material has an outer jacket 9 worked to high precision and serving to position the plug ferrule within a bush. At the cable end, a cylindrical connecting body 10 is inserted in the plug sleeve. This connecting body is, in the longitudinal direction of the plug ferrule, equipped with a bore 5, 6 passing completely through and just large enough to accommodate an optical fiber. The bore section 5 is, with that, slightly longer than bore section 6.

A transverse bore forms a fusion access aperture 4, wherein the diameter of said transverse bore must evidently be selected in such a way that, laterally, sufficiently strong bridges of material remain. The transverse bore is at a slight distance from the plug sleeve 8. In the area of an entry surface 7, a small funnel-shaped extension can be arranged.

The face 3 of the plug ferrule 1 is formed by a mushroom shaped insert 11 possessing a face-bore 12 corresponding to the diameter of the optical fiber only in the outermost area. An intermediate sleeve 13 is arranged between the insert 11 and the plug sleeve 8, said intermediate sleeve, at its cable end, forming a mechanical stop for the connecting body 10. The individual components can be glued together and/or assembled with a press fit.

Figure 3:
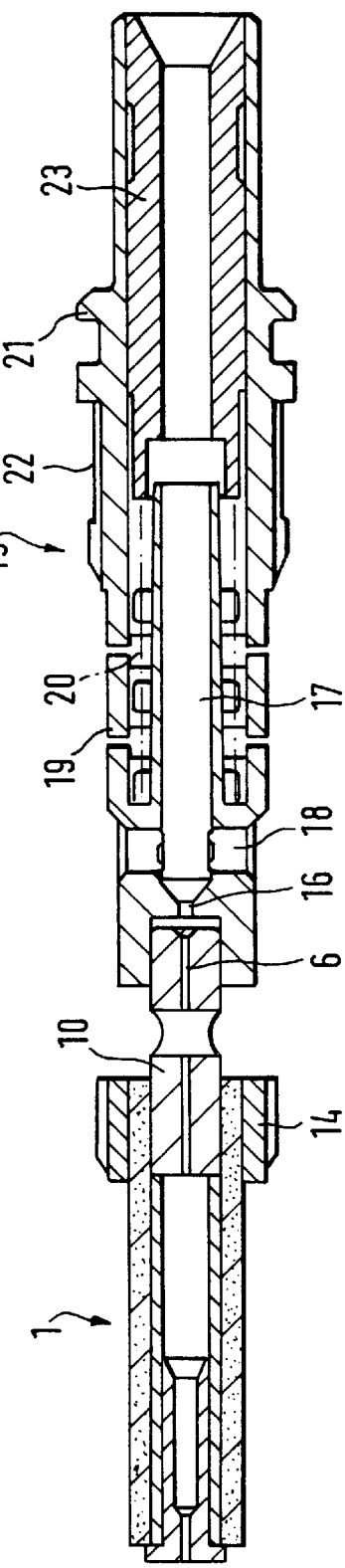

In the representation according to FIG. 3, the plug ferrule according to FIG. 1 is, at the cable end, connected with an cable accommodation element in general designated as 15. In addition, a positioning ring 14 is mounted on the plug sleeve 8 at the rear end, said ring later permitting angular positioning of the plug ferrule within an outer housing.

The cable accommodation element 15 fulfils different functions in that, on the one hand, it holds the optical fiber cable in a fixed position and, on the other hand, cushions the plug ferrule in the axial direction. For this purpose, the cable accommodation element has a skeleton-like, interrupted spring section 19, in which a coil pressure spring 20 is additionally arranged. The optical fiber is introduced through a first bore 16 into the connecting body 10, said first bore being arranged coaxially to the bore 6. A second bore 17 with greater diameter serves to accept the jacket surrounding the optical fiber.

Longitudinal press-in strips 22 are arranged on the outer side of the cable accommodation element, said strips serving to form a force-fitting connection with the plug casing. A strain relief boot can be affixed to a flange 21, and a cable guidance sleeve 23 simultaneously serves as a counter-bearing for the coil pressure spring 20.

A filling aperture 18 is arranged in the area of the transition from the first bore 16 to the second bore 17, the jacket surrounding the cable later being able to be glued through said aperture.

FIG. 4 shows, highly schematically, the pre-fitting of an optical fiber section 2 in the plug ferrule 1. First of all, an optical fiber cable 24 is introduced into the arrangement, the optical fiber 27 of said cable being stripped of its jacket 30 in a partial area. At the face end 3, the optical fiber is centred to the outer jacket 9 of the plug sleeve 8 using a centering and measurement device 25. For this purpose, light is fed from a light source 26 into the cable 24. The completed measurements can be registered using a suitable recording instrument.

After final fixation of the optical fiber within the plug ferrule 1, severing of the optical fiber is accomplished through the fusion access aperture 4, so that a section 2 remains in the plug ferrule. For this purpose, a cutting tool 29, for example, is pressed against a counter bearing 28.

After severing of the optical fiber 27, the optical fiber cable 24 is withdrawn in the direction of arrow a, as shown in FIG. 5. With that, a stub 31 of the optical fiber section 2 protrudes into the fusion access aperture. An arrangement prepared and exactly measured in this way can now, in turn, be connected with an optical fiber cable of any length in the field, as shown in FIGS. 6 and 7. An optical fiber cable 24 is introduced into the arrangement in the direction of arrow b in such a way that the optical fiber 27 protrudes into the connecting body up to the fusion access aperture 4. There, the cable-end optical fiber makes contact with the pre-fitted section 2. An arc 3 is generated by means of electrodes 32, the optical fibers being welded together under the influence of said arc. Subsequently, glue 34 is introduced through the filling aperture 18, said glue firmly anchoring the jacket 30 and at the same time protecting the optical fiber. Glue is also introduced into the fusion access aperture 4, in order to protect the optical fiber.

Figure 8:
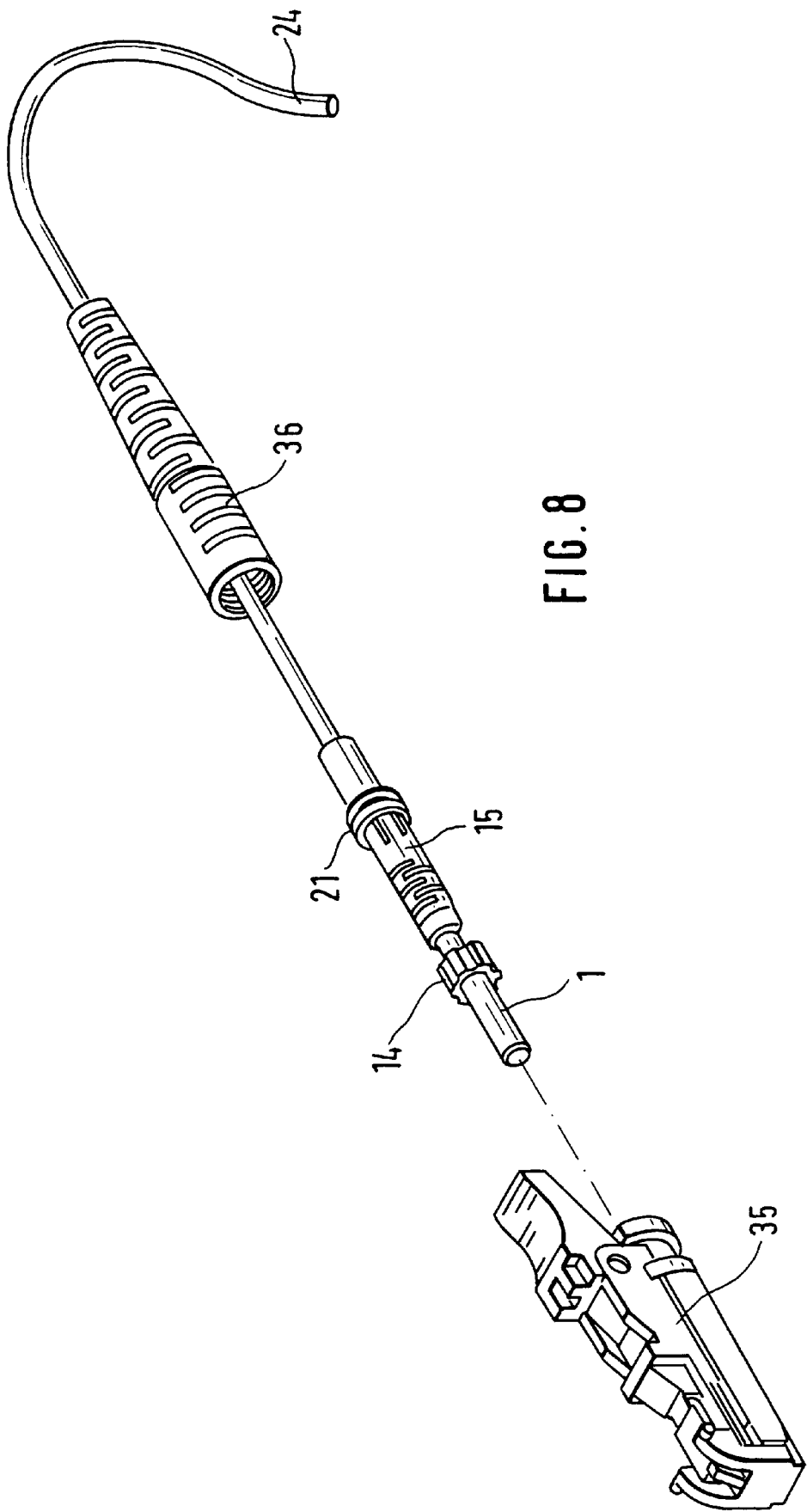

After the optical fiber cable 24 has been firmly fixed to the plug ferrule 1 in the way described, final assembly of the plug can ensue, as shown in FIG. 8. For this purpose, the cable accommodation element 15 is pressed into an essentially state-of-the-art plug casing 35, on which means are arranged for snap-in and release of the plug and face protection of the plug ferrule. A strain relief boot 36, previously drawn onto the cable, is snapped over the flange 21. This final assembly can also take place in the field, without the need for special tools.

Inasmuch as the invention is subject to modifications and variations, the foregoing description and accompanying drawings should not be regarded as limiting the invention, which is defined by the following claims and various combinations thereof:

We claim:

1. In a plug for an optical fiber connector, said plug comprising a plug ferrule having an end face, a cable entry surface, and therebetween a lateral access aperture, said ferrule having a bore adapted to hold a pre-fitted optical fiber section in such a way that said section extends through the plug ferrule bore from said end face to said lateral access aperture, whereby an optical fiber of an optical fiber cable which has been introduced into the bore from the direction of the entry surface can be fused within the lateral recess aperture to the pre-fitted optical fiber section, the improvement wherein the plug ferrule comprises at least a first and a second component, the first component having an outer jacket serving to center the plug ferrule and the second component having the lateral access aperture and said bore.

2. A plug according to claim 1, wherein the first component is a plug sleeve and the second component is a connecting body inserted into said plug sleeve, the lateral access aperture being arranged in a portion of the connecting body protruding out of the plug sleeve.

3. A plug according to claim 1, wherein the connecting body extends over a portion of the entire length of the plug sleeve only, and the face is formed by an insert held within the plug sleeve and with a central bore, said optical fiber section being fixed in said central bore.

4. A plug according to claim 3, wherein the plug sleeve comprises a hard ceramic material, and the connecting body comprises another material having a lesser degree of hardness.

5. A plug according to claim 3, further comprising an intermediate sleeve arranged between the insert and the plug sleeve, said intermediate sleeve limiting the penetration depth of the connecting body within said plug sleeve.

6. A plug according to claim 1, where the connecting body is connected to a cable accommodation element, said cable accommodation element having a first bore for accommodating the optical fiber, and a second bore with a larger diameter for accommodating the jacket surrounding the optical fiber, and further comprising a lateral adhesive filling aperture arranged in the cable accommodation element in the area of transition from the first to the second bore.

7. A plug according to claim 1, wherein the connecting body has a cylindrical section with a central longitudinal through bore, and the lateral access aperture is a transverse bore penetrating the cylinder section.

8. A plug according to claim 7, wherein the central longitudinal bore is subdivided by the transverse bore into two sections, of which the face-end section is longer than the cable-end section.

9. In method of manufacturing a plug for an optical fiber plug connector having a plug ferrule, comprising steps of pre-fitting an optical fiber section in such a way that said optical fiber section extends from an end face to a lateral access aperture within the plug ferrule, whereby an optical fiber of an optical fiber cable which has been introduced through a bore from the direction of a cable-end entry surface of the plug ferrule, can be fused in the lateral access aperture to the pre-fitted optical fiber section, the improvement comprising steps of introducing a continuous optical fiber into the plug ferrule from the entry surface to the end face, centering the optical fiber and fixing it in the plug ferrule at least in the area of the end face, working the end face, with the optical fiber end held within it, severing the optical fiber in the lateral access aperture, and then withdrawing the cable-end portion of the optical fiber from the plug ferrule.

10. A method according to claim 9, further comprising steps, prior to severing the optical cable, of supplying light from the direction of the cable, measuring the concentricity is measured at the face, and entering said concentricity into a register.

11. A method according to claim 9, further comprising a step of filling the lateral access aperture with an adhesive after fusing the optical fiber in the plug ferrule.

* * * * *